April 19, 1927.
F. T. WHITMARSH
CHEESE CUTTING DEVICE
Filed Oct. 15, 1926
1,625,441
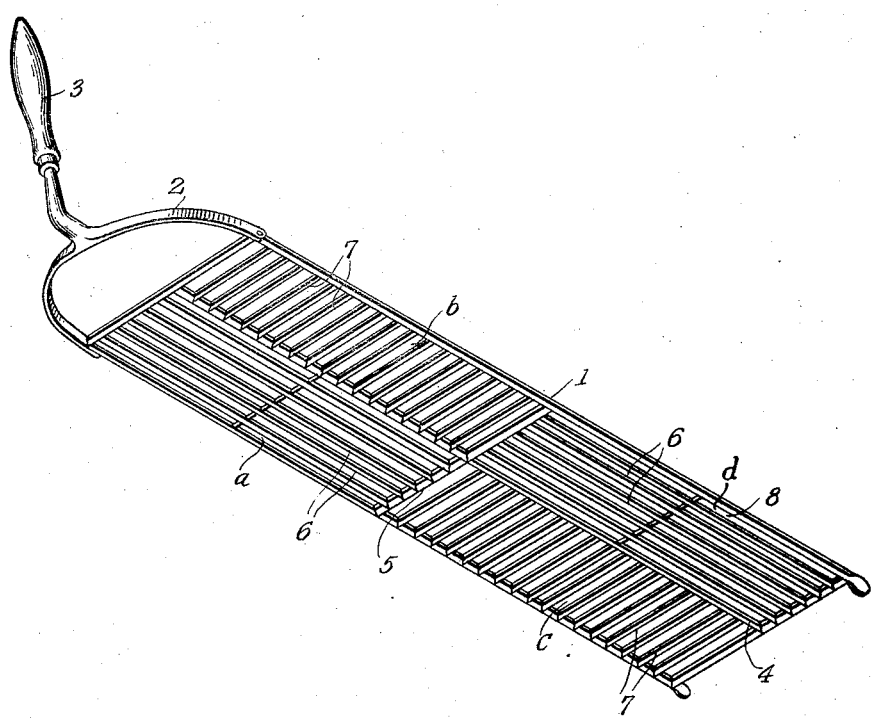
INVENTOR
Frederick F. Whitmarsh
BY
Charles L. Wright
ATTORNEY Patented Apr. 19, 1927.

1,625,441

UNITED STATES PATENT OFFICE.

FREDERICK THOMAS WHITMARSH, OF BLANDFORD, ENGLAND.

CHEESE-CUTTING DEVICE.

Application filed October 15, 1926, Serial No. 141,804, and in Great Britain October 20, 1925.

This invention relates to curd knives for use in cheese making, for cutting into cubes the curd contained in the vat or tub, after coagulation has set in. Such knives are elongated and rectangular in shape and of a length sufficient to reach to the bottom of the vat, and comprise a plurality of thin parallel cutting blades.

Hitherto such knives have been constructed with cutting blades arranged in one direction only, either longitudinal or transverse, and it was necessary in effecting the cutting operation to use a pair of knives one having longitudinal blades and one having transverse blades. Other previously proposed knives had diagonal blades, one knife only being required to cut the curd into cubes, such knife being drawn through the curd in two directions one perpendicular to the other, being reversed and drawn back in each case. Such diagonally-bladed knives. however, were found to warp in use.

The present invention has in view to construct a single knife in such a manner that it will serve the purposes of both longitudinally and transversely bladed knives and which will not warp in use, and to provide a knife the construction of which gives great strength and rigidity.

A curd knife comparing to the present invention comprises a lower cutting part adapted to be slidably drawn through the curd and an upper handle forming a fixed extension of said cutting part, and is characterized in that the cutting part is constructed with a thin central longitudinal division which itself forms a cutting member, and with transverse blades on one side of said division and longitudinal blades on the other side of said division, the blades being so arranged that longitudinal and transverse blades do not intersect or cross one another.

This arrangement of longitudinal and transverse blades is such that if the knife is drawn through the curd in two different directions, one perpendicular to the other and is reversed and drawn back in each of such directions, the curd will be cut into cubes.

The knife has also one or more transverse divisions, so that there are formed two or more separate pairs of sections one pair above another, each pair of sections comprising one section with longitudinal blades and one section with transverse blades, adjacent sections in a longitudinal direction having blades disposed perpendicular to one another.

The accompanying drawing is a perspective view looking from the underside of a knife made in accordance with the invention.

Referring to the drawing, the knife comprises an outer frame 1 preferably of steel substantially of rectangular shape which, at its upper end has an extension 2 furnished with a slanting handle 3. From top to bottom of the frame extends a thin central longitudinal division 4 which forms a cutting member, and is intersected at the centre of its length by a transverse division 5. Thus there are formed four separate sections, $a$, $b$, $c$, and $d$, in each of which there is a complete set of thin steel blades. Each set comprises a plurality of blades parallel to one another.

The upper and lower pairs of sections each comprise one section with longitudinal blades 6, and one section with transverse blades 7, and adjacent sections in a longitudinal direction have blades disposed perpendicular to one another. That is to say, considering the two adjacent sections $a$ and $c$ in a longitudinal direction, the section $a$ has longitudinal blades and the section $c$ has transverse blades; likewise with the sections $d$ and $b$.

In use, the knife is drawn through the curd in one direction and is then withdrawn and reversed and drawn back again in the same straight line so that the portion of curd previously cut by section $a$ is cut by section $b$ and the portion previously cut by section $c$ is cut by section $d$, and vice versa. Thus the curd is cut into elongated blocks. In order to cut the blocks into cubes the knife is drawn through the curd in a direction perpendicular to the previous direction and again withdrawn, reversed, and brought back in the same straight line.

The knife may be constructed with two or more transverse divisions instead of with one single division, in which case alternate sections in a longitudinal direction will have blades similarly disposed to one another, and adjacent sections will have blades disposed perpendicular to one another.

As changes of construction could be made within the scope of the invention, it is intended that all matter contained in the foregoing description or shown in the accompanying drawings shall be interpreted as illustrative and not in a limiting sense.

Having thus described my invention, what I claim as new and desire to secure by Letters Patent, is:—

1. A curd knife for use in cheese making and for manipulation by hand comprising a lower cutting part adapted to be slidably drawn through the curd and an upper handle forming a fixed extension of said cutting part, characterized in that the cutting part is constructed with a thin central longitudinal division which itself forms a cutting member, and with transverse blades on one side of said division and longitudinal blades on the other side thereof, said blades being so arranged that longitudinal and transverse blades do not intersect or cross one another, substantially as herein described.

2. A curd knife as claimed in claim 1, constructed with a central longitudinal division and a plurality of transverse divisions forming several separate pairs of sections one pair above another, each pair of sections comprising one section with longitudinal blades, adjacent sections in a longitudinal direction having blades disposed perpendicular to one another, substantially as herein described.

3. A manually operable curd knife comprising an oblong rectangular frame having side elements and an oblique handle at one end, a central rigid bar parallel to the side elements, a rigid transverse bar intermediate the length of said frame, a series of knives disposed longitudinally between the first named bar and one of the frame sides, a second series of longitudinal knives at the opposite side of the frame and at the other end thereof, and two series of knives transverse to the longitudinal knives.

4. A manually operable curd knife comprising an oblong rectangular frame having parallel sides and an oblique handle at one end, a central rigid bar parallel to the side elements, a rigid transverse bar intermediate the length of said frame, a series of long knives arranged longitudinally in said frame extending from the ends to the central transverse bar, said series being disposed in two sections at opposite sides of the frame, and a series of short knives arranged transversely in said frame at the sides of the long knives.

In testimony whereof I have signed my name to this application.

FREDERICK THOMAS WHITMARSH.